(12) United States Patent
Pollard et al.

(10) Patent No.: US 7,512,264 B2
(45) Date of Patent: Mar. 31, 2009

(54) IMAGE PROCESSING

(75) Inventors: Stephen B. Pollard, Dursley (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 11/152,927

(22) Filed: Jun. 15, 2005

(65) Prior Publication Data
US 2005/0286798 A1 Dec. 29, 2005

(30) Foreign Application Priority Data
Jun. 24, 2004 (GB) ................... 0414187.5

(51) Int. Cl.
*G06K 9/00* (2006.01)
(52) U.S. Cl. ..................... 382/162
(58) Field of Classification Search ............ 382/162, 382/164–167; 348/223.1, 630, 645, 647, 348/655, 678; 358/1.9, 516–520; 345/589, 345/597, 600, 603–604
See application file for complete search history.

(56) References Cited

U.S. PATENT DOCUMENTS

| 4,926,251 | A | * | 5/1990 | Sekizawa et al. | 358/535 |
| 5,475,507 | A | * | 12/1995 | Suzuki et al. | 358/500 |
| 6,075,905 | A | * | 6/2000 | Herman et al. | 382/284 |
| 6,243,070 | B1 | * | 6/2001 | Hill et al. | 345/589 |
| 6,434,266 | B1 | * | 8/2002 | Kanno et al. | 382/162 |
| 7,142,711 | B2 | * | 11/2006 | Goto et al. | 382/167 |

FOREIGN PATENT DOCUMENTS

EP 1395041 A2 3/2004

OTHER PUBLICATIONS

Search Report dated Oct. 19, 2004.
Search Report dated Oct. 20, 2004.

* cited by examiner

*Primary Examiner*—Jose L Couso

(57) ABSTRACT

An exemplary embodiment may be generally described as a method of digitally processing data representing at least part of an image, comprising applying a first color adjustment transform to data relating to a first range of spatial frequency of content of the image, the first transform adapted to constrain noise amplification, and applying a second color adjustment transform to data relating to a second range of spatial frequency of content of the image.

34 Claims, 8 Drawing Sheets

IMAGE PROCESSING

CLAIM TO PRIORITY

This application claims priority to copending United Kingdom utility application entitled, "IMAGE PROCESSING," having serial no. GB 0414187.5, filed Jun. 24, 2004, which is entirely incorporated herein by reference.

TECHNICAL FIELD

The present invention relates to the field of image processing.

BACKGROUND

Colour correction of digital colour images is required in a number of image processing contexts.

One important environment is in digital imaging. It is known to produce colour sensors by introducing an alternating pattern of colour filters onto the array of individual sensor elements of a device. Alternatively, an image sensor may capture information relating to a plurality of different wavelengths of light at each point of the sensor.

It is, however, difficult to construct colour filters for such sensors which exactly match the spectral characteristics of our eyes or which exactly match the primary colours used in computers to represent or display images. For this reason it is necessary for the captured images to be processed to transform the sensed colours to the desired colour system.

These issues apply to other contexts in which colour correction is required, such as for images generated by imaging systems having three CCD sensors (one for each colour plane) for example, by flatbed colour scanners, or by other imaging systems in which the colour image is formed from sets of separate, registered images. Certain of these issues may apply to other contexts also such as printing, where colour correction is used to map from one colour space to that of the printer such as, for example, from a standard RGB (Red, Green, Blue additive primary) colour space to the RGB space of the printer (prior to the final transformation to the physical CMYK (Cyan, Magenta, Yellow, Black subtractive primary) colour space of the printer).

When processing an image in order to transform it from one colour space to another, it is desirable to avoid mixing noise from a noisy channel, such as the blue colour channel for example, into a less noisy channel, such as the green colour channel for example, whilst still obtaining a satisfactory transformed image.

Co-pending United Kingdom Patent Application Number 0118456.3, incorporated by reference in its entirety herein, discloses a method for the colour correction of images. An image to be processed is split into low and high frequency components and colour correction is applied to the low frequency component only. In this manner, the effect of noise is reduced during the colour correction process as the higher spatial frequency component of the image, which generally carries a larger proportion of the noise in an image, has no colour correction applied to it.

The process of GB0118456.3 is suitable for modest transforms within the same basic colour space such as RGB to RGB, but it does not work particularly well in more extreme situations such as when transforming from complementary colours such as CMY to the primary RGB colours for example.

Both Japanese Patent Application No. 2003-110860 and "Suppression of Noise Amplification During Colour Correction", Kharitonenko et al., IEEE Transactions on Consumer Electronics, Vol. 48, No. May 2, 2002 (Published), pp. 229-233 describe processes for colour correction of images.

A further enhancement of GB0118456.3, incorporated by reference in its entirety herein, is described in U.S. patent application Ser. No. 10/216,648. Therein, an adjustment may be applied to the high frequency image before recombining it with the colour corrected low frequency image in order to provide additional colour correction around areas of highly chromatic edges.

Despite this improvement and the fact that any high frequency image component processing only occurs around highly chromatic edges, some noise is still introduced into the final transformed image by virtue of the high frequency image component processing. Furthermore, the computation required to robustly identify strong chromatic edges is high, and not entirely suited to use in mobile devices in which processing power is limited.

SUMMARY OF THE INVENTION

According to a first embodiment, there is provided a method of digitally processing data representing at least part of an image, comprising applying a first colour adjustment transform to data relating to a first range of spatial frequency of content of the image, the first transform adapted to constrain noise amplification and applying a second colour adjustment transform to data relating to a second range of spatial frequency of content of the image.

According to a second embodiment, there is provided a method of transforming data representing colour in an image, the method comprising applying a first transform to the image data, applying a second transform to the image data, wherein the first transform facilitates a noise-constrained transformation of a first range of the image data to provide first transformed image component data, the second transform facilitates a transformation of a second range of the image data to provide second transformed image component data, the method further comprising using at least the first and second transformed image component data to generate data representing a transformed image.

According to a third embodiment, there is provided a method of transforming data representing colour in an image, the method comprising processing the image data in order to resolve the data into at least two components, applying a first transform to data relating to a first component, applying a second transform to data relating to a second component, wherein the first transform facilitates a constrained transformation of the data relating to the first component to provide first transformed image component data, the second transform facilitates a transformation of the data relating to the second component to provide second transformed image component data, and combining the first and second transformed image component data to provide transformed image data.

According to a fourth embodiment, there is provided an image processing device operable to apply a first colour adjustment transform to data relating to a first range of spatial frequency of content of an image, said first transform adapted to constrain noise amplification, and apply a second colour adjustment transform to data relating to a second range of spatial frequency of content of the image.

According to a fifth embodiment, there is provided an image processing device comprising an image capture element operable to generate data in the MYC colour space representing an image, the device operable to apply a first colour adjustment transform to data relating to a first range of spatial frequency of content of the image, said first transform adapted to constrain noise amplification, and apply a second colour adjustment transform to data relating to a second range of spatial frequency of content of the image.

BRIEF DESCRIPTION OF THE DRAWINGS

For a better understanding of the present invention, and to further highlight the ways in which it may be brought into effect, embodiments will now be described, by way of example only, with reference to the following drawings in which.

It should be emphasised that the term "comprises/comprising" when used in this specification specifies the presence of stated features, integers, steps or components but does not preclude the presence or addition of one or more other features, integers, steps, components or groups thereof.

DETAILED DESCRIPTION

Figure 1:
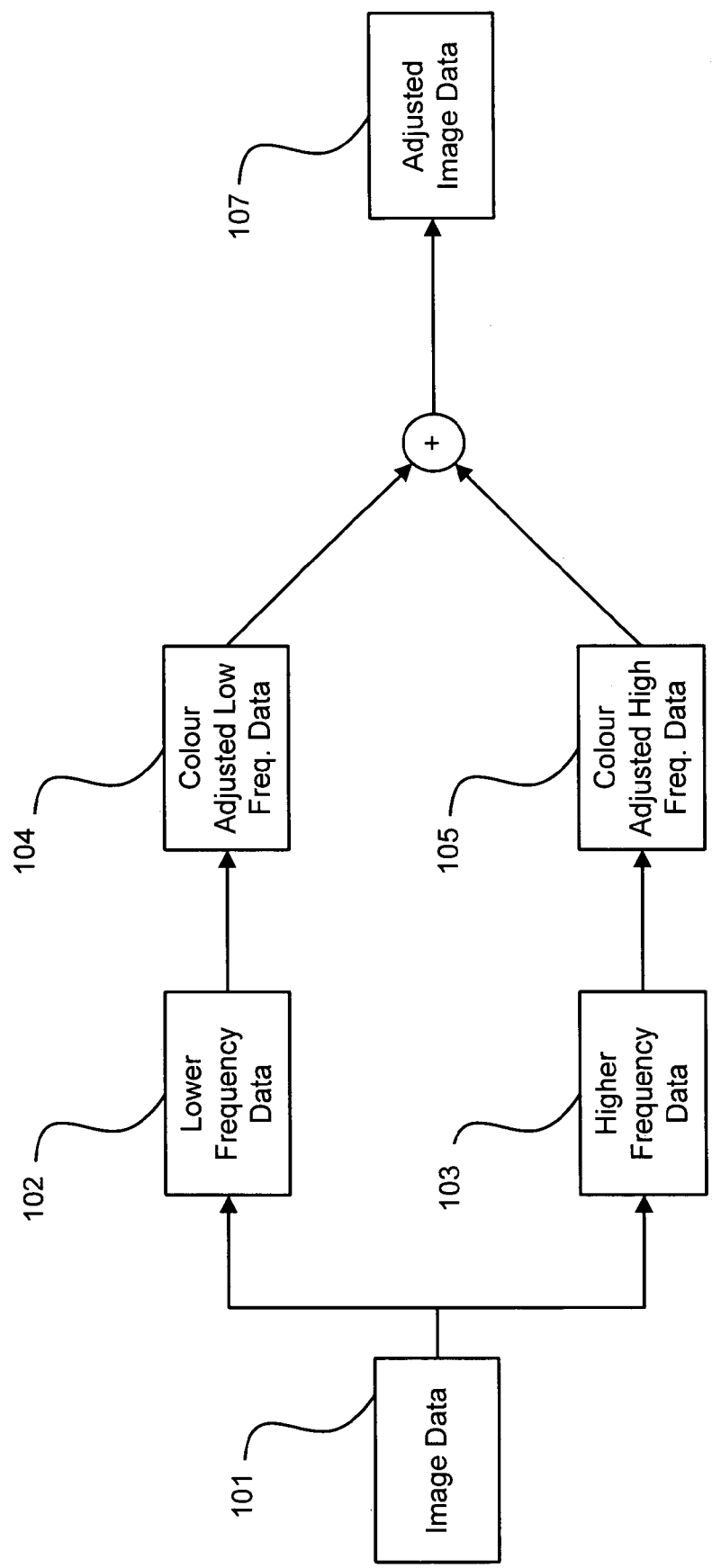
FIG. 1 is a control diagram relating to a method of obtaining colour adjusted image data.

FIG. 1 is a control diagram relating to a method of obtaining colour adjusted image data. At steps 102, 103 of FIG. 1, image data 101 to be transformed is resolved into data relating to lower and higher frequency components. At step 104, a colour transform adapted to maintain a desired level of colour accuracy is applied to the data relating to the lower frequency components, with a low noise transform being applied to the data relating to the higher frequency component at step 105. The corrected data components are combined using a simple pixel-wise addition for example, to produce adjusted image data 107. The method will be described in more detail below.

In a first step, the raw image data 101 is resolved into different components. For example, higher and lower frequency components respectively.

In an embodiment, higher frequency elements of the image data are removed by smoothing to obtain the lower frequency image data 102. In an embodiment, the difference between the image data 101 and the low frequency image data 102 provides the high frequency image data 103. This is depicted is FIG. 2 in which image data 101' is used to provide low frequency image data 102'. In an embodiment, the difference between the image data 101' and the low frequency data 102' gives the high frequency data 103'.

The lower frequency image data 102, 102' is transformed using a colour transform in order to produce colour adjusted low frequency image data 104.

The higher frequency image data 103, 103' is transformed using a colour transform in order to produce colour adjusted high frequency image data 105.

Figure 2:
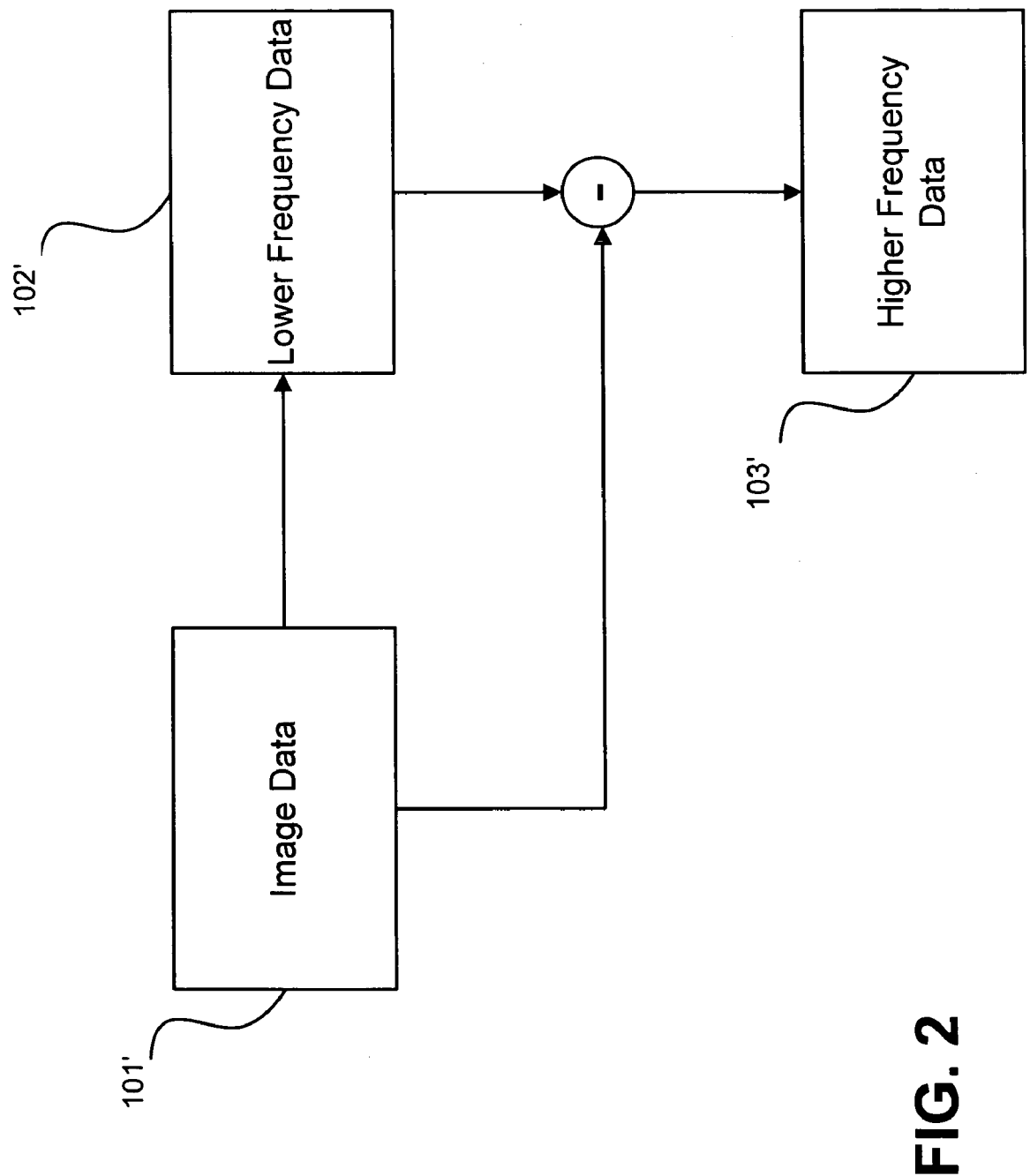
FIG. 2 is a further control diagram relating to obtaining high and low frequency data for use in the method of FIG. 1.

The colour adjusted lower and higher frequency image data 104, 104', 105, 105' is combined to provide adjusted image data 107. In one embodiment, the method described with reference to FIGS. 1 and 2 provides adjusted image data 107 corresponding to a different colour space to that of the image data 101, 101'. For example, image data 101, 101' can correspond to the MYC colour space, while adjusted image data 107 can correspond to the RGB or sRGB colour spaces. It is also possible that image data 101, 101' can correspond to the RGB or sRGB colour spaces, whilst adjusted image data 107 can correspond to the RGB or sRGB colour spaces respectively, or the MYC colour space. Other alternatives are possible.

Adjusted image data 107 represents an image, and this image will be of comparable resolution to the image represented by the image data 101, 101' since it includes the high frequency components of the image data 101, 101'.

A frequency threshold value may be used in association with the above described method in order to assist in resolving image data into lower and higher frequency components. More specifically, spatial frequency components of the image to be transformed with a frequency below the threshold are defined as lower spatial frequency components, whilst those above the threshold are defined as higher spatial frequency components.

The frequency threshold value may vary on a case by case basis depending on factors such as the nature of the image being processed, and/or the accuracy of colour transform required for example.

The method of FIGS. 1 to 5 will now be described in more detail.

The lower frequency image data 102, 102' is created by use of an appropriate smoothing technique. Suitable techniques are discussed in, for example, Gonzalez and Woods, "Digital Image Processing", pages 189 to 201, Addison & Wesley, 1992.

Image data 101, 101' generally comprises data relating to a plurality of colour planes corresponding to colour data of an image (not shown). There are generally three such colour planes (R, G and B or M, Y and C for example) which are registered to generate a final full colour image.

To create the low frequency image 102, 102', each colour plane (if appropriate) is treated separately. For example, if there are three colour planes, there will be in effect three low frequency images created.

If there is an intensity value for each pixel of interest in each colour plane, no treatment will need to be applied to the images in addition to smoothing. However, if this is not the case an interpolation step or similar will be required. Suitable interpolation is described in GB 0118456.3 for example, and various known techniques are applicable. Such interpolation may be performed before or after a low frequency image 102, 102' is generated.

If it is assumed that there is an intensity value for each pixel in each colour plane, the low pass filtering and colour correction results in the formation of a full resolution colour corrected low pass image to which constrained-transformation high frequency image can then be added.

A range of filtering techniques are available for smoothing an image in order to provide data 102, 102', including use of finite response filters, infinite response filters, processing in the Fourier domain or block averaging. In an embodiment, a two-dimensional Gaussian spatial filter/distribution G(x,y) may be constructed in order to perform the filtering. Such a filter typically takes the form:

$$G(x, y) = \frac{1}{2\pi\sigma^2} e^{-\frac{x^2+y^2}{2\sigma^2}}$$

where $\sigma$ is the standard deviation of the distribution.

Normally all three sets of original smoothed image pixels—assuming three colour planes—are processed to perform a transformation from one colour space to another resulting in colour adjusted low frequency image data 104.

A general form of a colour transform matrix, M, may be applied to the spectral elements, c, of an image to be transformed in order to provide the elements of a transformed image, x, so that $$x = Mc \text{ or, } \begin{bmatrix} x_1 \\ x_2 \\ \vdots \\ x_p \end{bmatrix} = \begin{bmatrix} m_{11} & m_{12} & \cdots & m_{1n} \\ m_{21} & m_{22} & \cdots & m_{2n} \\ m_{31} & m_{32} & \cdots & m_{3n} \\ \vdots & \vdots & \cdots & \vdots \\ m_{p1} & m_{p2} & \cdots & m_{pn} \end{bmatrix} \begin{bmatrix} c_1 \\ c_2 \\ \vdots \\ c_n \end{bmatrix}.$$

The elements of c can be the colour values of the set of n colour filters of an imaging device for example, which are transformed using M to a different colour space resulting in x.

In general, a transformation or colour adjustment from one colour space to another will occur by applying a transform to an image which comprises three colour values such as RGB, sRGB or MYC at each image location (perhaps after some interpolation in the case of a de-mosaiced image for example). In this respect, a simplified version of the colour transform matrix above may be used in which M may be a 3×3 matrix for example. It will be appreciated, however, that the present method is applicable in situations where more or less colour values are present. In addition, colour transforms may be effected using look-up tables instead of by the use of matrices as described above, and it will be appreciated by those skilled in the art that the present method is applicable whatever the nature of the colour transform used.

For each of the colour planes concerned, the high frequency component image, H, is calculated by the pixel-wise sum:

$$H = I - L$$

where I is the raw image to be transformed, and L is the low frequency component of I.

When computing the colour transformation matrix for the transformation of the high frequency component it is possible to balance the competing requirements of colour accuracy and noise amplification by adding constraints on the determination of the transform elements. More specifically, the constraint that $$\sqrt{\left(\sum_j \alpha_j m_{ij}^2\right)} \leq T_n$$

where $T_n$ is a noise threshold, may be applied when computing the colour transformation matrix elements in order to provide effective colour correction without amplifying noise beyond specified limits as defined by the above threshold.

The term $$\sum_j \alpha_j m_{ij}^2$$

is a measure of the amplification of noise, where the $\alpha_j$ are weighting factors which are introduced in order to compensate for the fact that each colour channel may carry differing amounts of noise.

The above threshold may be determined on a case by case basis depending on certain factors including the nature of the image sensor used to obtain an image, the degree of colour correction required, and the required suppression of noise. In general, however, $T_n = 1$. Hence a value at or below unity will cause noise not to be amplified or be reduced respectively. Any value below unity however, whilst reducing noise will cause any colour correction to become sub-optimal in the sense that colour errors will be introduced into a transformed image. In general, limiting the degree of noise amplification by constraining a transformation may cause large errors. For example, the correction obtained from the colour space transformation may not be adequate, and may not correctly map the colour space to the desired output.

In an embodiment, an image to be transformed is resolved into at least two components, and a noise-constrained transformation matrix obtained as described above is applied to one of the components, with an unconstrained (i.e. not noise-constrained as described above) transformation applied to the other component. In this way different colour processing is effectively applied to each component. In an embodiment, the unconstrained transformation is adapted to maintain a desired level of colour accuracy.

More specifically, most colour information of an image is carried in low frequency components of the image. In this connection, it is therefore possible to apply a noise-constrained transformation to the higher frequency components resolved from the image without introducing significant visible artefacts into the image as a result of the colour correction. The amplification of errors resulting from using the above-mentioned constraint on the amplification of noise on the transformation is therefore limited.

The noise-constrained transform applied to the higher frequency components of the image is the transform which is adapted to maintain a desired level of colour accuracy subject to the constraints on the degree of noise amplification as defined above. Hence the lower frequency arid higher frequency transformed components of the image to be corrected are low noise due to the noise reduction characteristics of the low pass smoothing filter used for the low frequency components, and the fact that the colour transform applied to the high frequency components does not amplify noise.

In general therefore, a transformed image I' may be obtained from:

$$I' = M_1 L + M_2 H$$

where $M_1$ and $M_2$ are the transforms applied to the low and high frequency components of the image to be transformed respectively wherein, in a preferred embodiment $M_2$ is a noise constrained colour transformation, and $M_1$ is a colour transform.

It follows that:

$$I' = (M_1 - M_2)L + M_2 I$$

since $I = L + H$. The above may therefore be expressed as:

$$I' = AL + BI$$

where $A = M_1 - M_2$ and $B = M_2$. Hence, a transformed image, such as a colour transformed image according to an embodiment may be obtained by performing transforms to either a) the high and low spatial frequency components of the image, or b) the low spatial frequency component and the original image.

Compared to a situation in which the higher frequency components of an image are not processed, the present method reduces both chrominance and luminance errors in the high frequency components without reintroducing noise.

Figure 3:
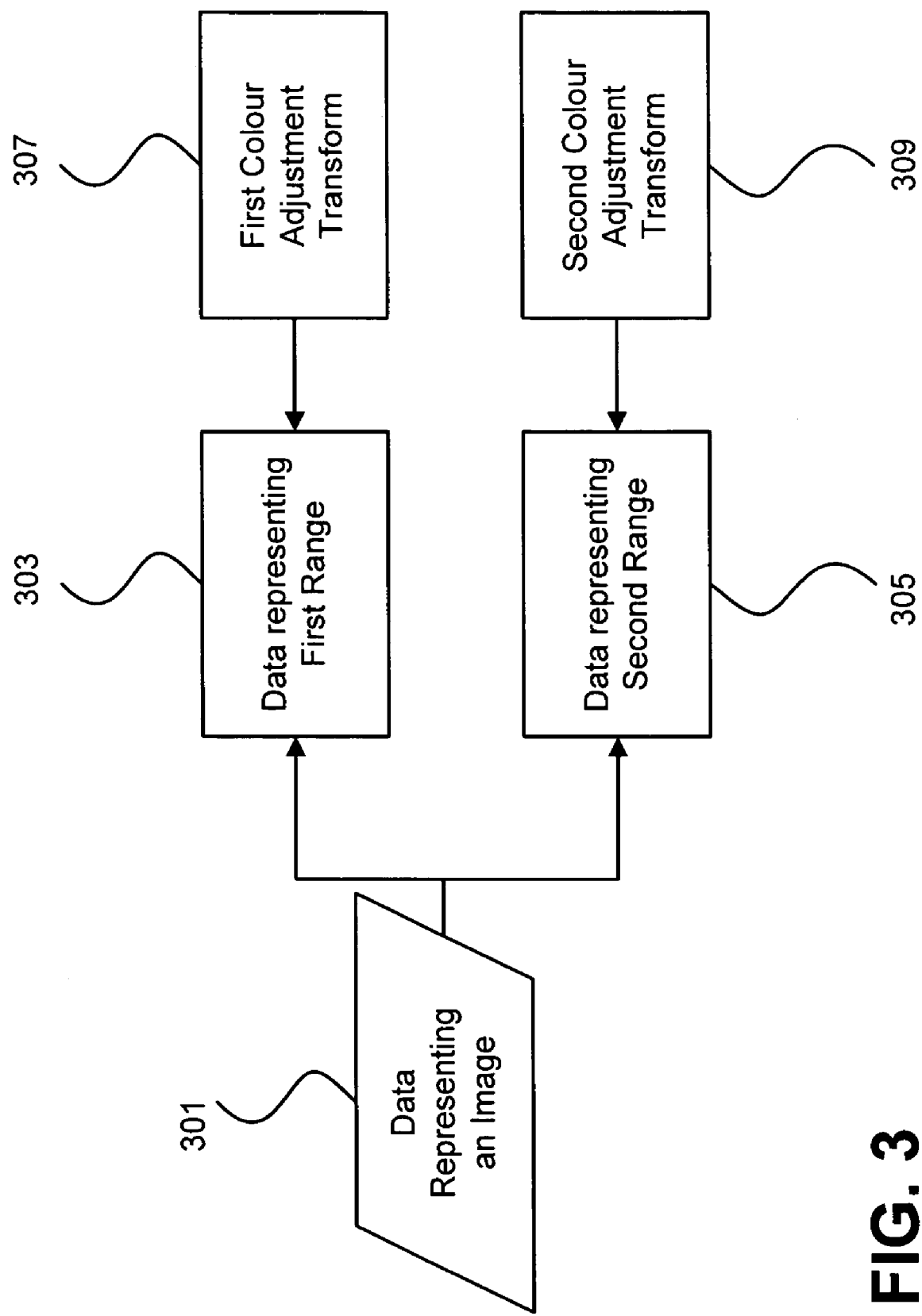
FIG. 3 is a control diagram relating to a method of obtaining colour adjusted image data.

FIG. 3 is a flow diagram relating to a process of adjusting colour data of an image. Data representing an image 301 comprises data representing first and second ranges 303, 305 of spatial frequency of content of the image. A first colour adjustment transform 307 is applied to data relating to a first range 303 of spatial frequency of content of the image, said first transform 307 adapted to constrain noise amplification. A second colour adjustment transform 309 is applied to data relating to a second range of spatial frequency of content of the image.

Figure 4:
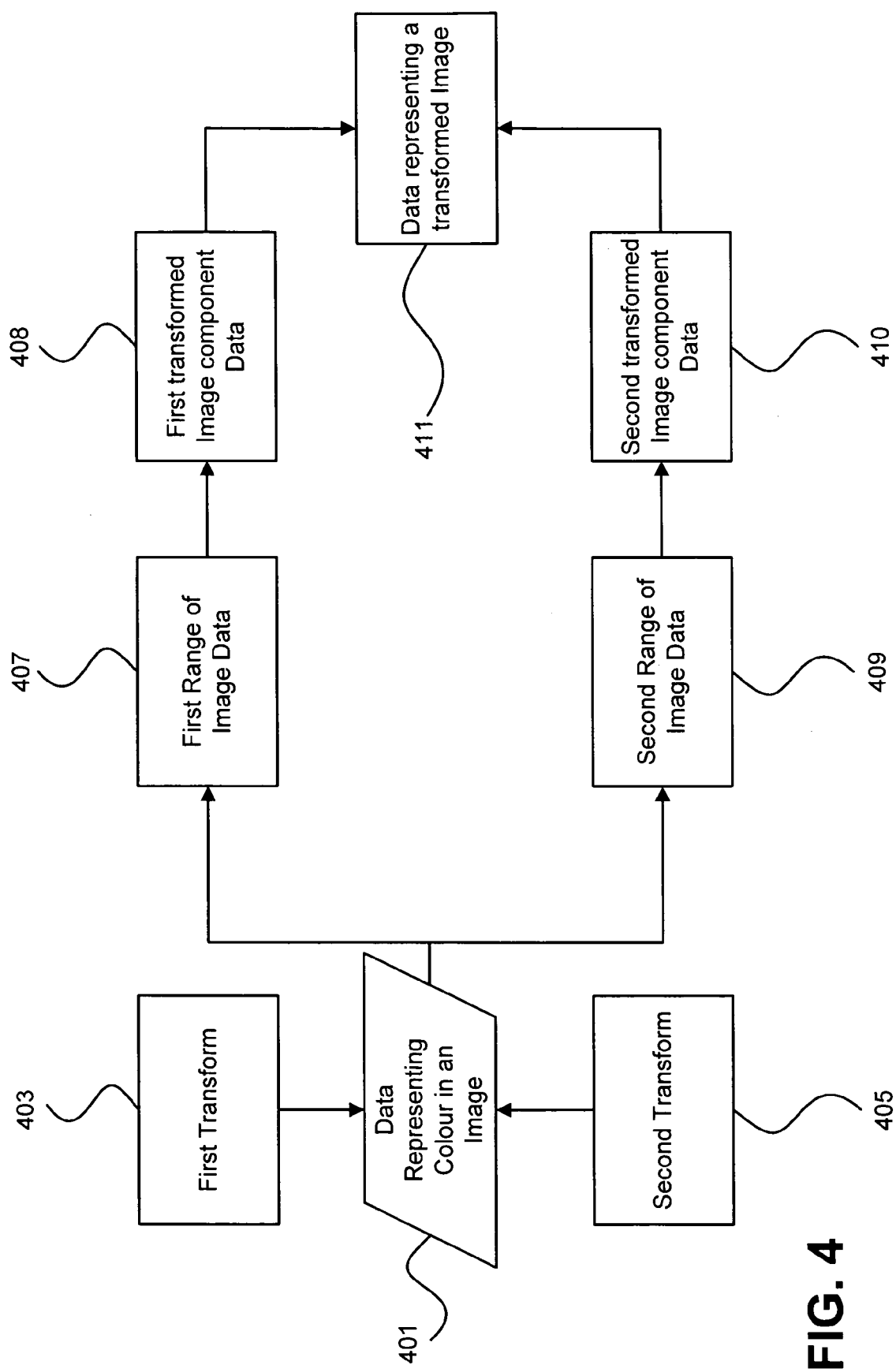
FIG. 4 is a further control diagram relating to a method of obtaining colour adjusted image data.

FIG. 4 is a further flow diagram relating to a process of adjusting colour data of an image. Data representing colour in an image 401 has first 403 and second 405 transforms applied to it. The first transform 403 facilitates a noise-constrained transformation of a first range 407 of the image data 401 to provide first transformed image component data 408, and the second transform 405 facilitates a transformation of a second range 409 of the image data 401 to provide second transformed image component data 410. At least the first 408 and second 410 transformed image component data to generate data representing a transformed image 411.

Figure 5:
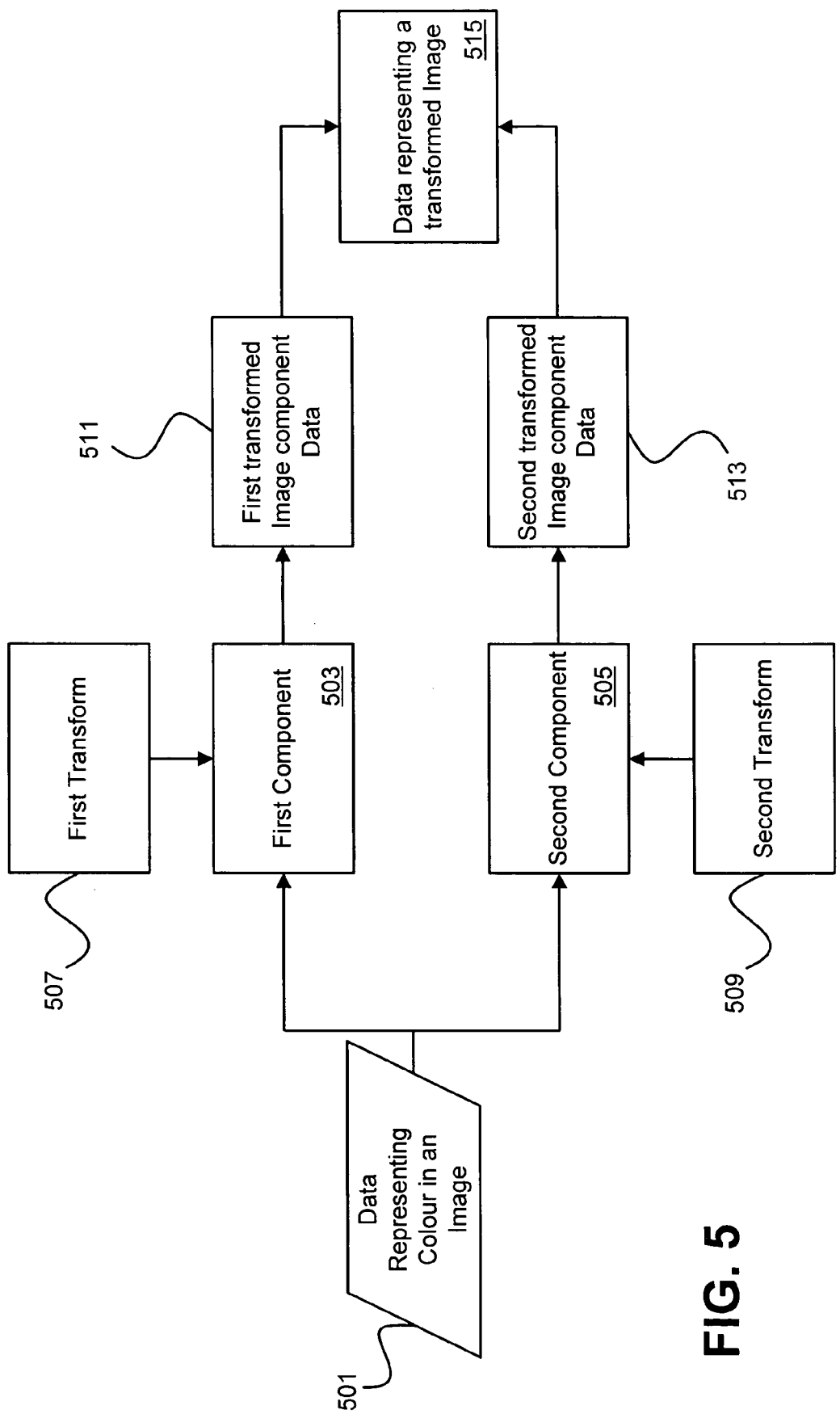
FIG. 5 is a further control diagram relating to a method of obtaining colour adjusted image data.

FIG. 5 is a further flow diagram relating to a process of adjusting colour data of an image. Data 501 representing colour in an image is processed in order to resolve the data into at least two components 503, 505. A first transform 507 is applied to data relating to a first component 503, and a second transform 509 is applied to data relating to a second component. The first transform 507 facilitates a constrained transformation of the data relating to the first component 503 to provide first transformed image component data 511, and the second transform 509 facilitates a transformation of the data relating to the second component 505 to provide second transformed image component data 513. The first 511 and second 513 transformed image component data is used to provide transformed image data 515.

Figure 6:
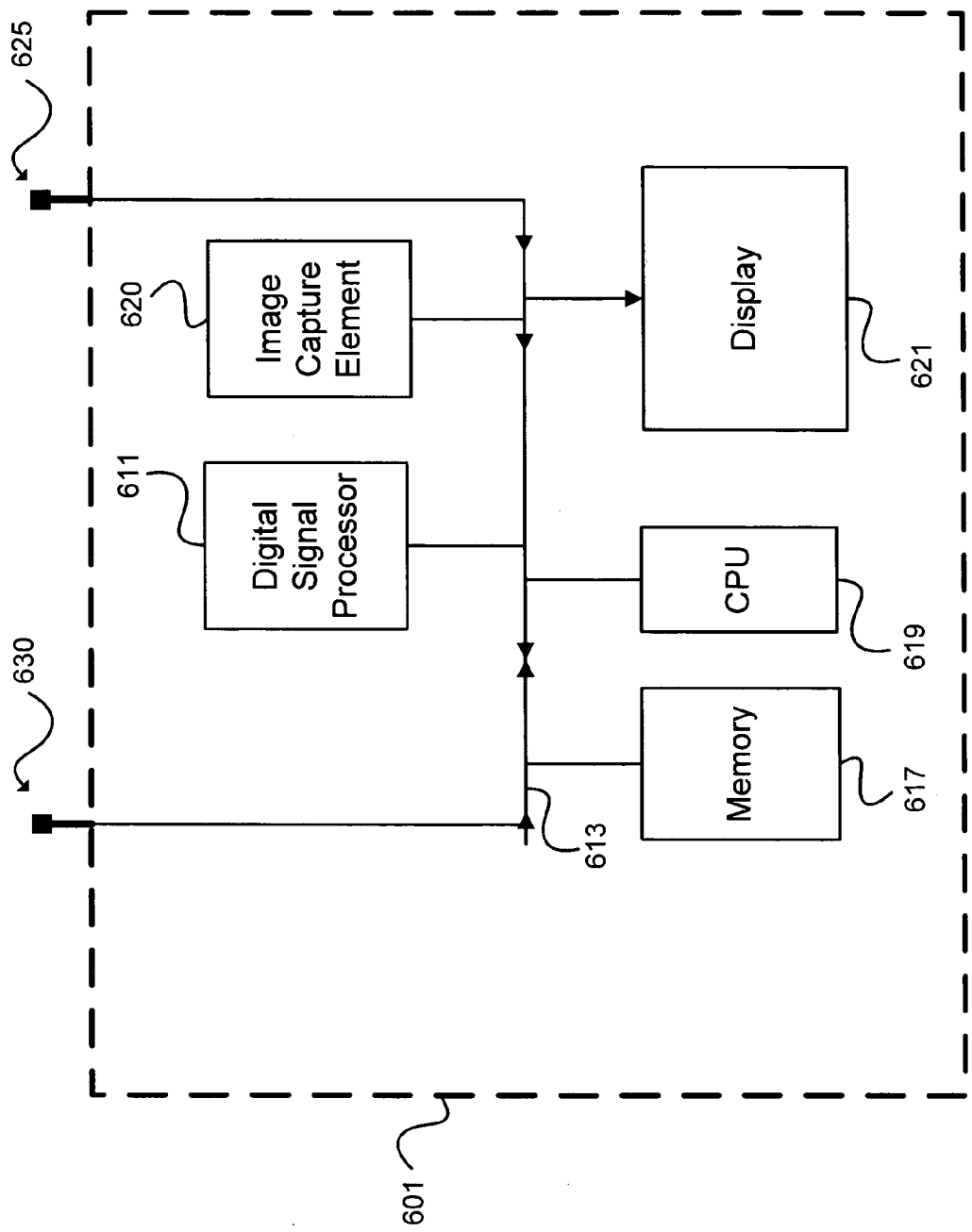
FIG. 6 is a schematic representation of an image processing device.

FIG. 6 is a schematic representation of an image processing device.

The device 601 comprises a digital signal processor (DSP) 611, and receives data representing an image that can be processed. The data representing an image may be generated using an image capture element 620 of the device 601 such as a CCD or CMOS device for example, or may be received from a source external to the device 601 using the input port represented by 625.

A bus, or similar, 613 is operable to transmit data and/or control signals between the DSP 611, memory 617, central processing unit (CPU) 619, image capture element 620, display 621, and input port 625 of the device 601.

Memory 617 may be dynamic random-access memory (DRAM) and may include either non-volatile memory (e.g. flash, ROM, PROM, etc.) and/or removable memory (e.g. memory cards, disks, etc.). Memory 617 may be used to store image data as well as processed image data, and can also be used to store instructions operable to cause the CPU 619 and/or the DSP 611 to process image data.

Input device 625 can comprise a conventional input port operable to receive a physical entity such as a wire connection to a network using a cable (including Ethernet cable, RJ45 connectors or USB for example) or a memory card for example, or may be a device operable to receive data using a wireless connection such as Bluetooth or WiFi for example. Other alternatives are possible.

In use, a computer program comprising machine readable instructions suitable for implementing steps in the method as described above with reference to FIGS. 1 to 5 is loaded into the device memory 617. The instructions may be resident in a ROM area of memory 617 (not shown) and may, from there, either be loaded into RAM for execution by the CPU 619 and/or DSP 611 or executed directly by the CPU 619 and/or DSP 611 from ROM.

The instructions, when executed using the CPU 619 and/or DSP 611, are operable to digitally process data representing at least part of an image, which data has been generated using the image capture element 620, or received using the input device 625.

Processed data may be displayed using display 621 of the device 601, or may be output from the device 601 using output device 630, which can comprise a conventional output port operable to receive a physical entity such as a wire connection to a network using a cable (including Ethernet cable, RJ45 connectors or USB for example) or a memory card for example, or may be a device operable to transmit data using a wireless connection such as Bluetooth or WiFi for example. Other alternatives are possible.

The inclusion of the image capture element 620 is optional, and need not be present in the device 601.

Note that in most arrangements it will not be necessary to store the whole raw image frame at one time in volatile memory. The image processing can be performed on the fly, thus requiring only as much memory as is necessary to perform the imaging pipeline. So after first portions of image data have been read from the sensor into memory it is possible to generate compressed image data for the start of the image and begin storing these in long term memory. This results from the fact that all processes operate only on a limited area of the image. In other words, although the "images" constructed at each stage of the process could be complete sets of data that extend across the entire image, in practice this adds cost in terms of memory and throughput capacity. Therefore, the "images" used at each stage of the process will in general be created piecemeal, with the process operating on localised portions of the image. In the limit all the computation may be carried out for a single pixel from the pixels in its neighbourhood.

The exemplary method discussed above discloses the splitting of a raw image into a higher frequency image and a lower frequency image, and adjusting the colour of the images using suitable transforms. This method can readily be extended to use of three or more images, each representing different frequency components. One effective way to do this is after using a first smoothing step (equivalent to that used to create the low pass image in the general method above) to create an intermediate mid-blur image, then to carry out a further smoothing step to create a further full-blur image. The difference between the original raw image and the mid-blur image gives the high frequency image, the difference between the mid-blur image and the full-blur image gives the intermediate frequencies, and the full-blur image itself gives the low frequencies. Clearly, this procedure could be extended further to give still more frequency ranges.

Separate colour transformation or correction could then be carried out on each of these different frequency components in accordance with the different requirements of those frequencies so that each individual channel does not amplify noise.

It will be appreciated by those skilled in the art that a certain degree of optimisation of the implemented method is possible. For example, in a preferred embodiment wherein an image to be processed is resolved into multiple frequency components, it can be determined how closely matched to each other the features in the higher frequency (substantially monochrome) components are, and whereabouts colour information occurs in these images. In this respect, colour correction need only be applied to the areas of these images in which colour information is present providing the remainder of the (generally) monochrome images are substantially the same.

Other characteristics of an image to be transformed may be used in order to perform the necessary colour transformation. For example, a particular measure of edge strength in an image can be used. Alternatively, a multi-resolution representation of an image resulting from a wavelet analysis may be used. Other alternatives are also possible.

The boundaries of the higher and lower spatial frequency ranges described above may be determined on a case by case basis, or with reference to a threshold value below which frequency components of an image can be defined as low frequency components, and above which, frequency components of an image can be defined as high frequency components.

In practice, transformations may be applied to image data as a whole, or in part, without resolving an image to be transformed into different components. While the method described above resolves an image to be transformed into separate components, and more specifically into separate frequency components, it will be appreciated that image data may alternatively be processed according to alternative embodiments without it having been resolved or needing to be resolved into different components. In fact, it is an advantage of the method when implemented in mobile devices such as digital cameras or mobile stations (mobile telephones) with imaging functionality and the like, that it may be applied to data relating to a captured image without the need for data corresponding to image components to be generated.

It will be appreciated that an image to be transformed will generally consist of a plurality of pixels in a plurality of colour planes which are registered in order to provide a colour image. Whilst there are generally three such colour planes, the method is applicable in situations where there are more or less of such colour planes. For example, the method can be applied usefully if individual pixel locations have values for only one colour plane, for more than one of the colour planes, for all of the colour planes, and even if the pixels of one colour plane are not directly associated with pixels of another colour plane but are registered separately (as is the case where each colour is detected by a separate CCD sensor, for example).

Figure 7:
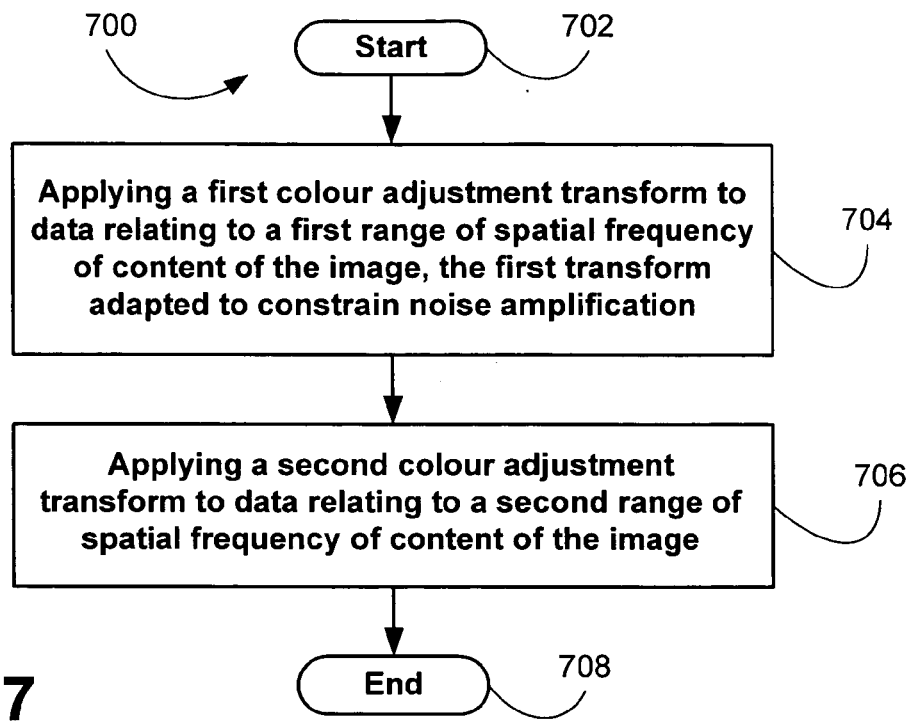
FIGS. 7-9 are flow charts illustrating exemplary embodiments for obtaining colour adjusted image data.
Figure 8:
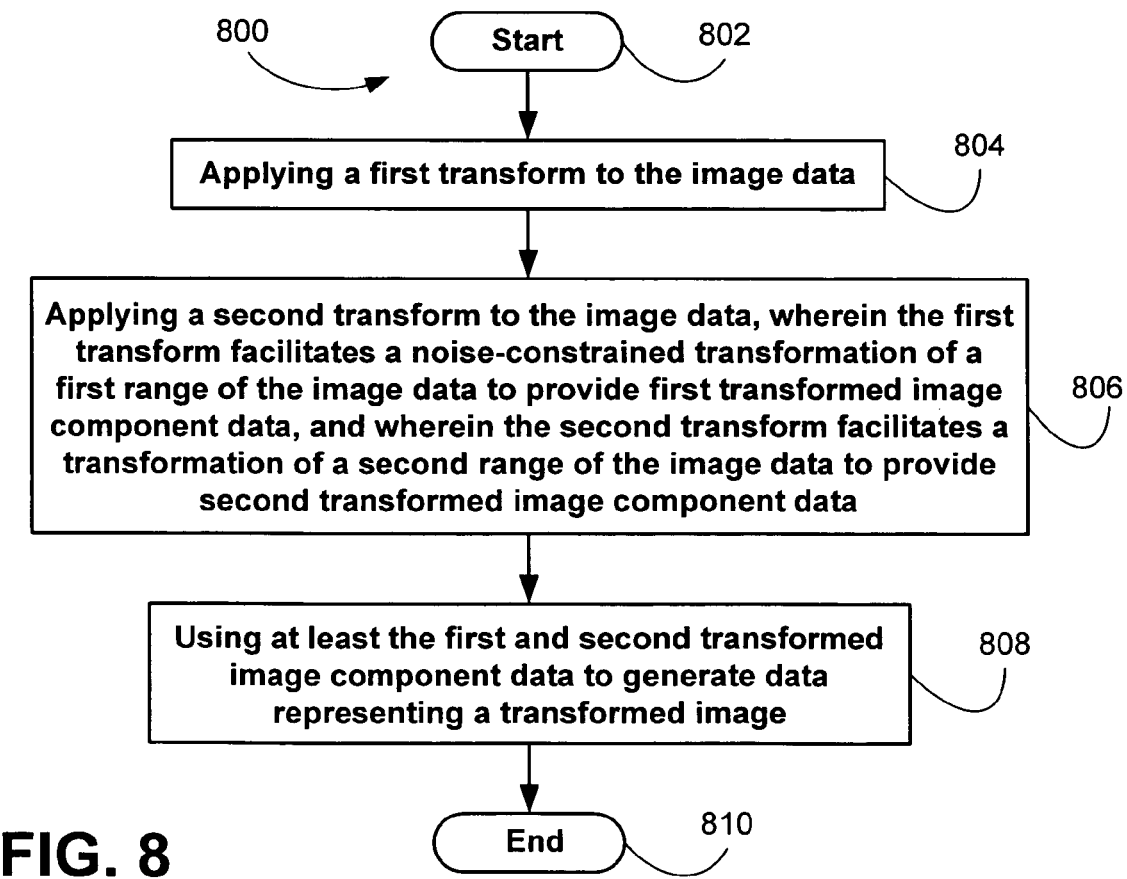
Figure 9:
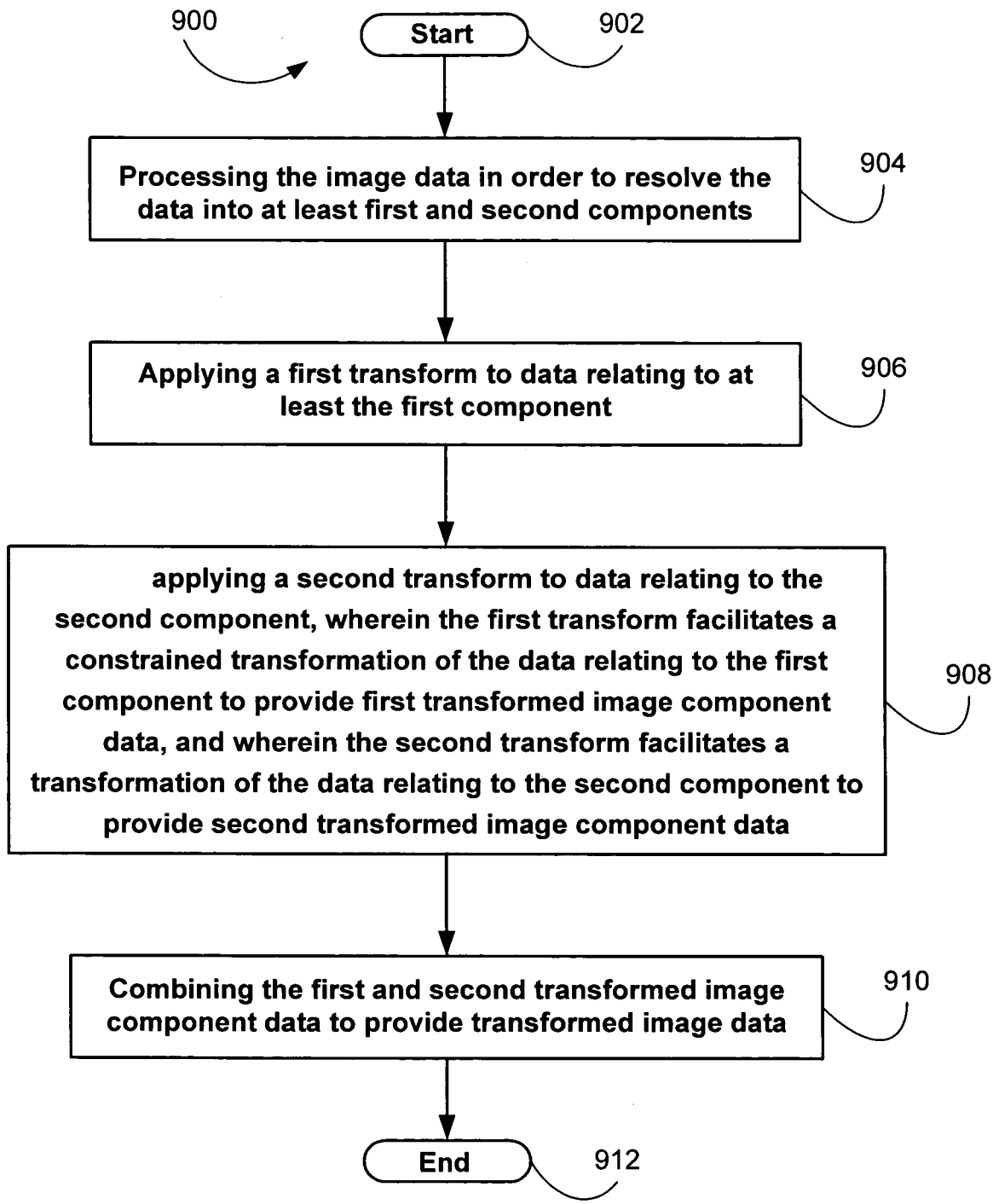

FIGS. 7-9 are flow charts illustrating exemplary embodiments for obtaining colour adjusted image data. The flow charts 700, 800 and 900 (FIGS. 7, 8 and 9, respectively) show the architecture, functionality, and operation of an embodiment for implementing device 601 (FIG. 6). Alternative embodiments implement the logic of flow charts 700, 800 and/or 900 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 7, 8 and 9, or may include additional functions. For example, two blocks shown in succession in FIGS. 7, 8 and 9 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process illustrated in flow chart 700 (FIG. 7) begins at block 702. At block 704, a first colour adjustment transform is applied to data relating to a first range of spatial frequency of content of the image, the first transform adapted to constrain noise amplification. At block 706, a second colour adjustment transform is applied to data relating to a second range of spatial frequency of content of the image. The process ends at block 708.

The process illustrated in flow chart 800 (FIG. 8) begins at block 802. At block 804, a first transform is applied to the image data. At block 806, a second transform is applied to the image data, wherein the first transform facilitates a noise-constrained transformation of a first range of the image data to provide first transformed image component data, and wherein the second transform facilitates a transformation of a second range of the image data to provide second transformed image component data. At block 808, at least the first and second transformed image component data are used to generate data representing a transformed image. The process ends at block 810.

The process illustrated in flow chart 900 (FIG. 9) begins at block 902. At block 904, the image data is processed in order to resolve the data into at least first and second components. At block 906, a first transform is applied to data relating to at least the first component. At block 908, a second transform is applied to data relating to the second component, wherein the first transform facilitates a constrained transformation of the data relating to the first component to provide first transformed image component data, and wherein the second transform facilitates a transformation of the data relating to the second component to provide second transformed image component data. At block 910, the first and second transformed image component data are combined to provide transformed image data. The process ends at block 912.

The exemplary method is applicable to image processing devices such as, for example, mobile stations (including mobile telephones), portable image display devices, personal digital assistants and the like, which devices may or may not include image capture functionality (including an image capture element such as a CCD or CMOS device for example).

What is claimed is:

1. A method of digitally processing data representing at least part of an image, comprising: using a processing device to implement the steps of applying a first colour adjustment transform to data relating to a first range of spatial frequency of content of the image, the first transform adapted to constrain noise amplification; and applying a second colour adjustment transform to data relating to a second range of spatial frequency of content of the image.

2. A method as claimed in claim 1, wherein the second colour adjustment transform is adapted to maintain a desired level of colour accuracy.

3. A method as claimed in claim 1, wherein the first range comprises data relating to the spatial frequency of content of the image above a threshold value.

4. A method as claimed in claim 1, wherein the second range comprises data relating to the spatial frequency of content of the image below a threshold value.

5. A method as claimed in claim 1, wherein the data relating to the first range of spatial frequency of content of the image is obtained by high-pass filtering the image data.

6. A method as claimed in claim 1, wherein the data relating to the second range of spatial frequency of content of the image is obtained by low-pass filtering the image data.

7. A method as claimed in claim 6, wherein low-pass filtering of the image data is effected using a normalised two-dimensional Gaussian spatial filter.

8. A method as claimed in claim 1, wherein the first and second transforms are colour transform matrices, respective elements of which define the respective colour adjustment transforms.

9. A method as claimed in claim 8, wherein said first transform is adapted to constrain noise amplification by constraining the square root of the sum of the square of the transform elements of the said first transform to a value less than or equal to a noise threshold value.

10. A method as claimed in claim 9, wherein the noise threshold value is unity.

11. A method as claimed in claim 1, comprising applying the first colour adjustment transform to the data relating to the first range of spatial frequency of content of the image so as to provide data representing a first colour adjusted image part;
applying the second colour adjustment transform to the data relating to the second range of spatial frequency of content of the image so as to provide data representing a second colour adjusted image part; and
using data representing said first and second colour adjusted image parts to provide data representing a colour adjusted image.

12. A method as claimed in claim 11, wherein the data representing the first-mentioned image corresponds to a first colour space, and said data representing the colour adjusted image corresponds to a second colour space.

13. A method as claimed in claim 12, wherein the first or second colour spaces are any one of the RGB, sRGB or MYC colour spaces.

14. A method of transforming data representing colour in an image, the method comprising: using a processing device to implement the steps of
applying a first transform to the image data;
applying a second transform to the image data, wherein the first transform facilitates a noise-constrained transformation of a first range of the image data to provide first transformed image component data, and wherein the second transform facilitates a transformation of a second range of the image data to provide second transformed image component data; and
using at least the first and second transformed image component data to generate data representing a transformed image.

15. A method as claimed in claim 14, wherein the second range of data is selected such that data falling within the range is data with a noise content below a predetermined value.

16. A method as claimed in claim 14, wherein the second transform is adapted to maintain a desired level of colour accuracy.

17. A method as claimed in claim 14, wherein the first range of data relating to the image comprises data relating to spatial frequency of content of the image above a threshold value.

18. A method as claimed in claim 14, wherein the second range of data relating to the image comprises data relating to spatial frequency of content of the image below a threshold value.

19. A method as claimed in claim 14, further including resolving data relating to the image into at least first and second components, wherein the first transform is applied to data representing the first component, and the second transform is applied to data representing the second component.

20. A method as claimed in claim 14, wherein the first range of data is the image data.

21. A method as claimed in claim 14, wherein the first transform is constrained such that the square root of the sum of the square of the elements of the transform is less than or equal to a noise threshold value.

22. A method of transforming data representing colour in an image, the method comprising: using a processing device to implement the steps of
processing the image data in order to resolve the data into at least first and second spatial frequency components;
applying a first transform to data relating to at least the first spatial frequency component;
applying a second transform to data relating to the second spatial frequency component, wherein the first transform facilitates a constrained transformation of the data relating to the first spatial frequency component to provide first transformed image component data, and wherein the second transform facilitates a transformation of the data relating to the second spatial frequency component to provide second transformed image component data; and
combining the first and second transformed image component data to provide transformed image data.

23. An image processing device operable to:
apply a first colour adjustment transform to data relating to a first range of spatial frequency of content of an image, said first transform adapted to constrain noise amplification; and
apply a second colour adjustment transform to data relating to a second range of spatial frequency of content of the image.

24. A device as claimed in claim 23, further comprising an image capture element operable to capture data representing an image.

25. A device as claimed in claim 24, wherein applying the first colour adjustment transform to the data relating to a first range of spatial frequency of content of the image provides data representing a first colour adjusted image part; and
applying the second colour adjustment transform to the data relating to a second range of spatial frequency of content of the image provides data representing a second colour adjusted image part; the device operable to:
use data representing said first and second colour adjusted image parts in order to provide data representing a colour adjusted image.

26. A device as claimed in claim 25, wherein the data relating to said first and second ranges relates to a first colour space, and said data representing a colour adjusted image relates to a second colour space.

27. A device as claimed in claim 26, wherein said first or second colour spaces are any one of the MYC, RGB or sRGB colour spaces.

28. A device as claimed in claim 24, wherein said data representing an image relates to any of the RGB, sRGB or MYC colour spaces, and said data representing a colour adjusted image relates to either of the RGB or sRGB colour spaces.

29. An image processing device comprising an image capture element operable to generate data in the MYC colour space representing an image, the device operable to:
apply a first colour adjustment transform to data relating to a first range of spatial frequency of content of the image, said first transform adapted to constrain noise amplification; and
apply a second colour adjustment transform to data relating to a second range of spatial frequency of content of the image.

30. A computer readable medium having stored thereon computer program instructions, the program comprising logic configured to perform:

applying a first colour adjustment transform to data relating to a first range of spatial frequency of content of the image, said first transform adapted to constrain noise amplification; and applying a second colour adjustment transform to data relating to a second range of spatial frequency of content of the image.

31. A computer readable medium having stored thereon computer program instructions, the program comprising logic configured to perform:

applying a first transform to the image data;

applying a second transform to the image data, wherein the first transform facilitates a noise-constrained transformation of a first range of the image data to provide first transformed image component data, and wherein the second transform facilitates a transformation of a second range of the image data to provide second transformed image component data; and using at least the first and second transformed image component data to generate data representing a transformed image.

32. A computer readable medium having stored thereon computer program instructions, the program comprising logic configured to perform:

processing data representing colour in an image in order to resolve the data into at least first and second spatial frequency components;

applying a first transform to data relating to at least the first spatial frequency component;

applying a second transform to data relating to the second spatial frequency component, wherein the first transform facilitates a constrained transformation of the data relating to the first spatial frequency component to provide first transformed image component data, and wherein the second transform facilitates a transformation of the data relating to the second spatial frequency component to provide second transformed image component data; and combining the first and second transformed image component data to provide transformed image data.

33. A method as claimed in claim 22, wherein the first spatial frequency is above a threshold value.

34. An image processing device as claimed in claim 29, wherein the first range comprises data relating to the spatial frequency of content of the image above a threshold value.

* * * * *